J. MEIKLE.
HITCHING AND RELEASING DEVICE.
APPLICATION FILED MAY 31, 1910.
970,936.
Patented Sept. 20, 1910.
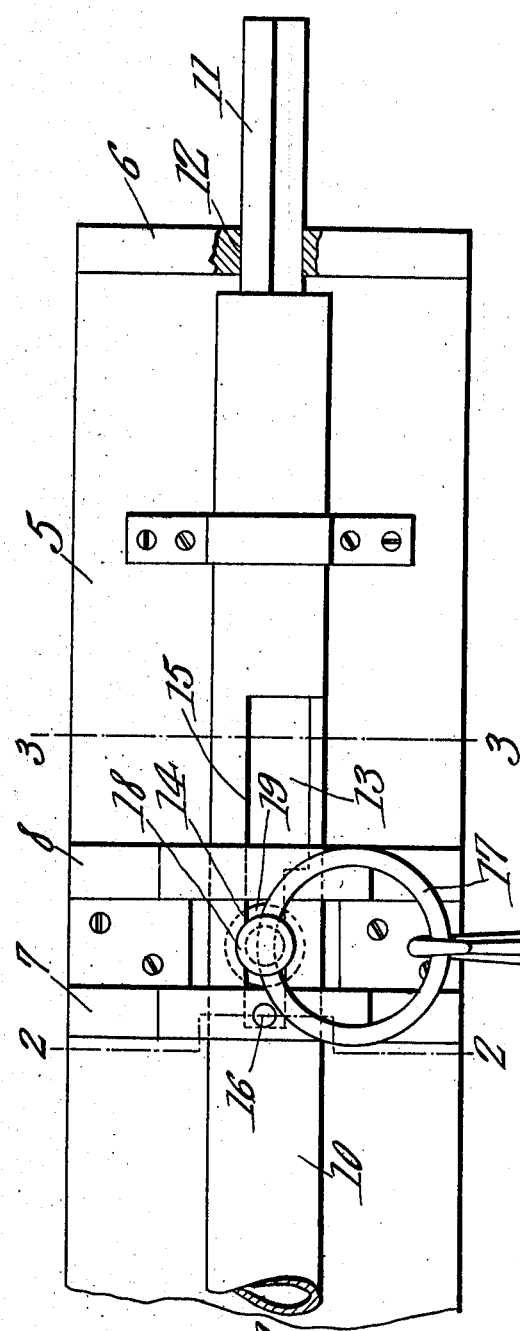
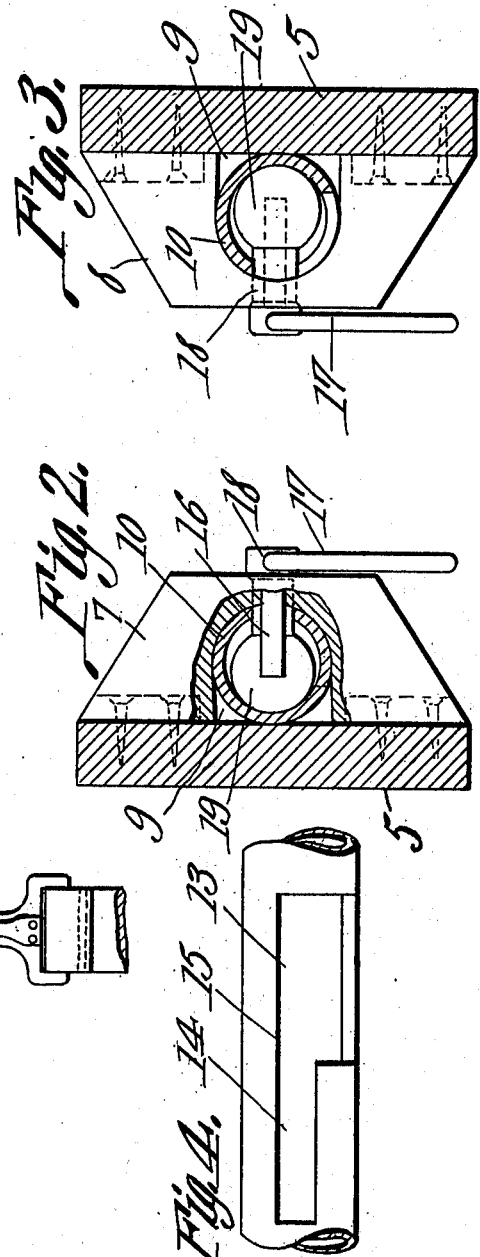
Witnesses
John Meikle,
Inventor
by C. A. Snow & Co.
Attorneys

UNITED STATES PATENT OFFICE.

JOHN MEIKLE, OF SPRINGFIELD, ILLINOIS.

HITCHING AND RELEASING DEVICE.

970,936.            Specification of Letters Patent.    Patented Sept. 20, 1910.

Application filed May 31, 1910. Serial No. 564,124.

*To all whom it may concern:*

Be it known that I, JOHN MEIKLE, a citizen of the United States, residing at Springfield, in the county of Sangamon and State of Illinois, have invented a new and useful Hitching and Releasing Device, of which the following is a specification.

It is the object of the present invention to provide a hitching and releasing device adapted particularly for use in large stables or where a number of stalls are arranged in a line and the primary aim of the invention is to provide a device simple in construction and readily operable either to hitch animals within their respective stalls or to simultaneously release the animals so that they may escape from the building in which the stalls are located, in the event of fire or other apparent danger.

A further aim of the invention is to so construct the device that the animals hitched thereby will not be restrained in their movements in their respective stalls although they will be securely hitched until simultaneously released.

With the above and other objects in view, the invention consists in the construction and arrangement of parts shown in the accompanying drawings, in which, Figure 1 is a front elevation of the device embodying the present invention, Fig. 2 is a vertical sectional view therethrough on the line 2—2 of Fig. 1, Fig. 3 is a similar view on the line 3—3 of Fig. 1, and, Fig. 4 is a detail view of the slotted portion of the tubular member of the device.

In the drawings, the numeral 5 indicates a board which may be one of the front boards of a manger or feed trough or may be a board to be secured to one of the boards. There is also shown a short board 6 which may be one of the walls of the building in which the device is mounted or it may be a bracket upon the end one of the stall troughs, or may be one wall of one of the end troughs, it being understood that the character of the members 5 and 6 is really immaterial so far as the invention is concerned.

Secured upon the front face of the board 5 is a support including spaced members indicated one by the numeral 7 and the other by the numeral 8. These members of the support are formed each with an opening indicated by the numeral 9 and these openings are alined so as to slidably receive a tubular member 10 which is preferably in the form of a length of iron tubing or like material. At one end of this tubular member 10 there is an axially extending rectangular stem indicated by the numeral 11 and this stem slides through a correspondingly shaped opening 12 in the board 6 at the end of the board 5 and serves to prevent rotation of the tubular member in the supporting members 7 and 8.

At suitably spaced points in its length, the tubular member 10 is formed with slots the function of which will be presently explained, only one of such slots being here shown however as this showing is sufficient to illustrate clearly the principles of the invention. It may be stated however at this point that the slots are equal in number to the stalls and that the tubular member 10 is to be extended continuously through the walls of the stalls and directly in advance of the feed troughs therein. Also, it may be stated that the brackets or supports embodying the spaced members 7 and 8 are equal in number to the stalls through which the tubular member extends and that these supports are located in such position within the stalls as to register, so to speak, with the slots in the said tubular member.

The slot in the tubular member 10, before mentioned, throughout a portion of its length is relatively wide as indicated by the numeral 13 and throughout the remainder of its length is relatively narrow as at 14 and one longitudinal edge 15 of the slot is of right line extent whereas the opposite edge is irregular whereby the relatively wide and relatively narrow portions of the slot are afforded. It will be observed that the relatively narrow portion of the slot opens through the front side of the tubular member 10 and that the relatively wide portion 13 of the slot opens not only through this side but also through the under side of the said tubular portion and the purpose of such arrangement and location of the slot portions will presently be fully explained. A pin indicated by the numeral 16 is carried by the member 7 of the support for the tubular member 10 and this pin projects into the slot formed in the said tubular member and coöperates with a hitching member in a manner to be now explained.

The hitching member above mentioned consists of a ring 17 which is pivoted to one end of a shank or stem 18 carrying at its opposite end a substantially spherical head 19 of a diameter slightly less than the diameter of the tubular member 10. In assembling the hitching member with the tubular member 10, the said member 10 is moved to the left as in Fig. 1 of the drawings until the relatively wide portion 13 of its slot lies between the spaced members 7 and 8 of the support for the said member 10. The head 19 of the shank 18 is then inserted through this portion of the slot and into the tubular member and the said member is then moved to the right until it assumes the position shown in Fig. 1 of the drawings. This movement of the member 10 will result in the relatively narrow portion of its slot being brought to position between the spaced members 7 and 8 and as these members are spaced apart a distance slightly greater than the diameter of the head 19 and as the portion 14 of the slot is only of sufficient width to receive the shank 18, the hitching device comprising the said shank, head 19, and ring 17, will be securely held against disengagement from the member 10 although it may have a certain degree of movement in a number of directions.

It will of course be understood that a hitching strap or the like is to be attached either permanently or temporarily to the ring 17, depending upon the character of the strap, and that whereas the hitching devices will be normally held firmly connected to the member 10, a pull upon the said member toward the left in Fig. 1 of the drawings will allow the hitching devices to simultaneously drop from engagement with the member.

It will further be understood that the projection of the pin 16 into the tubular member serves to prevent binding of the head of the hitching member in the bore of the said tubular member.

What is claimed is:—

1. In a device of the class described, a support including spaced members, a tube mounted slidably in said support and formed with a slot, a hitching member having a headed shank fitted in said slot and confined between the spaced members of said support, and a pin carried by one of the said spaced members and projecting into said slot.

2. In a device of the class described, a support including spaced members, a tube mounted slidably in the spaced members of said support and formed with a slot relatively wide throughout a portion of its length and relatively narrow throughout the remainder of its length, and a hitching member having a headed shank fitted in said slot and confined between the spaced members of said support, the said tubes being slidable to position with the relatively narrow portion of the slot between the spaced members of the support whereby to so confine the headed shank as to prevent withdrawal and being movable to position to bring the relatively wide portion of the slot between the said spaced members whereby to release the said headed shank.

In testimony that I claim the foregoing as my own, I have hereto affixed my signature in the presence of two witnesses.

JOHN MEIKLE.

Witnesses:
  ORA L. BIXLER,
  GEO. MEIKLE.